Patented Oct. 21, 1941

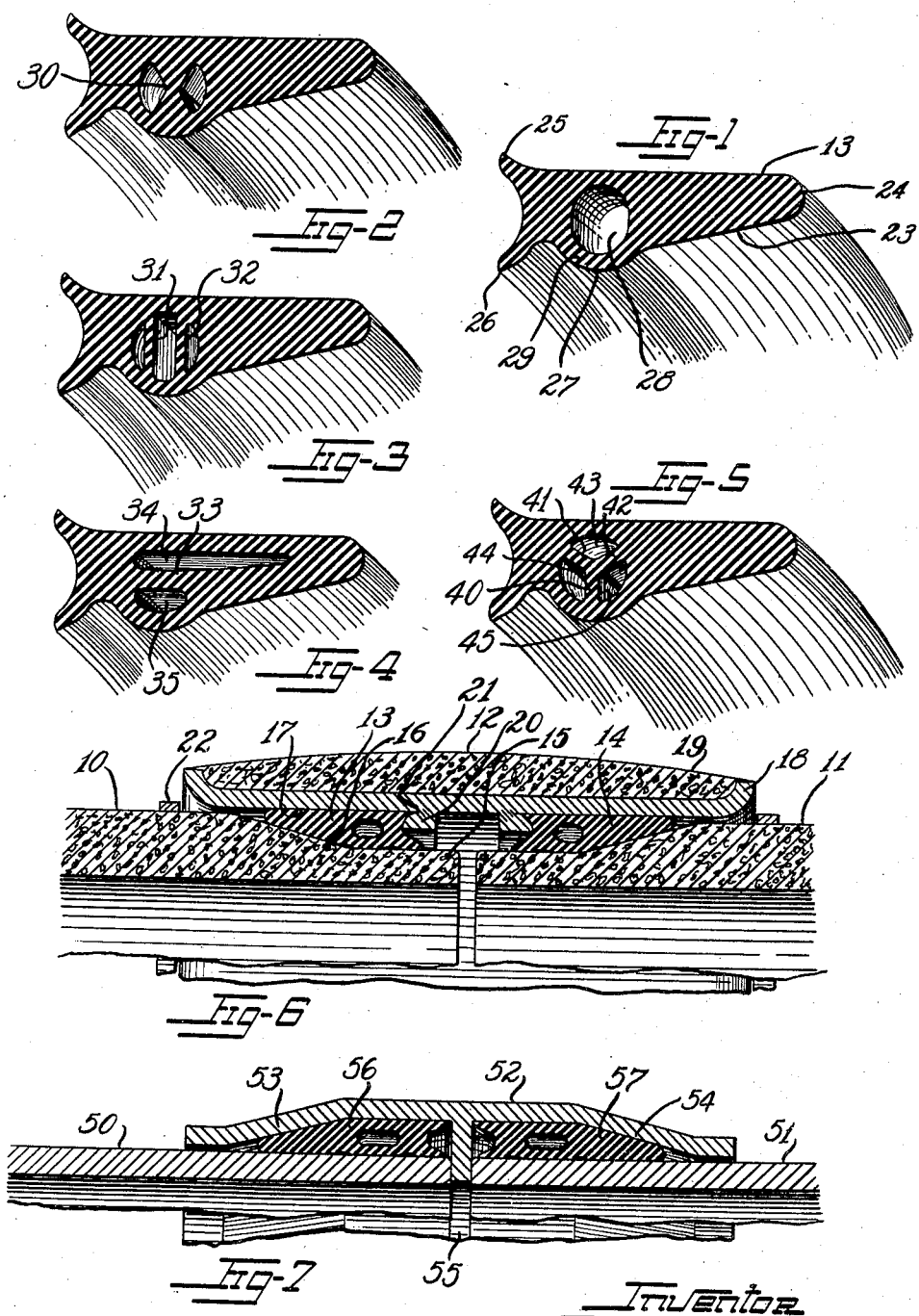

2,259,940

UNITED STATES PATENT OFFICE 2,259,940

PIPE JOINT GASKET

Tracy D. Nathan, Cuyahoga Falls, Ohio, assignor to The B. F. Goodrich Company, New York, N. Y., a corporation of New York Application April 16, 1940, Serial No. 329,919

3 Claims. (Cl. 288—5)

This invention relates to pipe joint assemblies and to gaskets therefor and is applicable where pipe members having telescoping parts are to be sealed, whether the members are of metal, glass, concrete, ceramic material, synthetic plastics, or other material.

Such joints are usually made in the field where difficulties of providing tight joints are complicated by close working space, presence of water in the ditch, and the requirement for rapid and simple assembly operations. Settling of the soil, and expansion and contraction of the line necessitate flexibility of the joint and ability to permit some axial movement of the pipe members with relation to each other. Fluctuation of pressure induces movement of the sealing member and makes undesirable the use of sealing members capable of holding high pressures only but incapable of holding low pressures, or sealing members capable of holding low pressures only but not high pressures, or sealing members which would creep along the joint under periodic fluctuation of pressure.

The principal objects of the present invention are to provide an improved gasket construction effective to seal at both high and low pressures, to provide flexibility, and to permit line expansion and contraction while effectively preventing creeping of the sealing member, and to provide these results while at the same time providing for convenience of assembly and economy of materials.

These and other objects will appear from the following description and the accompanying drawing.

Of the drawing:

Fig. 1 is a perspective view of a section of the sealing member of the invention in one of its forms;

Fig. 2 is a similar view of a modified form of the sealing member;

Fig. 3 is a similar view of another modification of the sealing member;

Fig. 4 is a similar view of a further modification of the sealing member;

Fig. 5 is a similar view of a still further modification thereof;

Fig. 6 is an axial cross section of one side of the complete joint as applied to concrete pipe and showing the sealing member of the type illustrated in Fig. 1, other parts being broken away; and Fig. 7 is a similar view of a joint as applied to straight pipe.

In accordance with the invention I provide a resilient gasket construction for obtaining packing pressure to resist effectively the tendency for the gasket to retreat from its advanced position upon release of the fluid pressure behind the gasket while at the same time providing for ease of assembly. Resistance to retreat is provided by a construction such that ease of assembly is not unduly hampered. I obtain the desired results by gasket constructions in which effective resistance to retreat is provided by a thickened zone or hump-like ridge between the front wedge portion and the rear sealing lips, resistance of the thickened portion to movement of a pipe member into the space during assembly of the pipe members preferably being reduced to the desired amount by a cellular construction of the gasket or sealing member in the region of the thickened zone.

Referring to the drawing, and first to Fig. 6, where the pipe members are designated by the numerals 10, 11, and 12, the invention is here applied to male-ended pipe members 10, 11 and a female sleeve member 12 with a pair of sealing members or gaskets 13, 14 between the sleeve and the other pipe members. The pipe member 10 is reduced in diameter at its end, as at 15 and is tapered, as at 16 adjacent thereto to provide a tapered seat for the sealing member 13. The sleeve pipe member 12 is formed with a cylindrical seating surface 17 opposed to the tapered and reduced portions to define a tapered space, the sleeve being only slightly larger in inside diameter than the external diameter of the body of the pipe so that the narrow end of the space is less than the thickness of sealing member at its nose.

The tapered space preferably is so proportioned as to hold the wedge-shaped sealing member firmly against retractive movement and preferably is of a taper about equal to the angle of friction of the adjacent materials, at which angle the gasket is not easily moved from its wedged position. While the sleeve may be made entirely of concrete, it may be made of less outside diameter by providing a facing 18 of metal of greater tensile strength or may be made entirely of metal. Where concrete 19 is applied thereover, additional strength and rigidity and protection from corrosion is provided. The sleeve may be formed with an internally projecting rib 20 to initially support the sealing member and this may be annularly undercut, as at 21 to clear the outer lip of the sealing member. The inner face of the rib 20 is sufficiently large in diameter to provide clearance for the inner lip of the gasket so that the latter will not be jammed during assembly.

The pipe member 10 may be formed with a pipe stop 22 to limit movement of the sleeve and to indicate complete assembly to the workman.

The sealing member 13 in its relaxed condition is illustrated in Fig. 1 and comprises an annular ring formed of resilient rubber-like material such as soft vulcanized rubber composition, polymerized vinyl chloride compositions, or other rubber-like resilient materials.

For wedging action, the ring is tapered in cross section axially thereof adjacent one margin thereof as at 23, the taper corresponding substantially to the taper of the space between the pipe members and terminating at the margin in a rounded nose 24 at its thinnest portion. The nose is of greater thickness than the narrowest end of the tapered space between the pipe members so that when the ring is driven into the space, as by the pressure of the fluid in the pipes, the ring will be wedged in the space in sealing engagement with the pipe members at a position remote from the narrowest portion of the space.

To provide for sealing at the rear end of the gasket so as to utilize the fluid pressure to drive the gasket into wedging position, the sealing member is provided at its rear end with a pair of oppositely disposed annular sealing lips or flanges 25, 26. These sealing lips have a normal spread greater than the widest radial dimension of the space between the pipe members and terminate in thin edges outwardly turned with respect to the sealing member so as to contact with the walls of the space even though there are surface irregularities therein such as small pits or projections. When the pipe members are assembled the flanges are deflected toward each other, and as their outer faces are sealed from fluid pressure within the pipe fluid pressure applied will press them thereby maintaining their initial sealing engagement while the fluid pressure drives the wedge portion of the sealing member into place.

Provision is made against retractive movement of the sealing member due to release of fluid pressure in the pipes or to periodic fluctuation of the pressure and further for initial seal of the sealing member before fluid pressure is applied to the line, regardless of inaccuracies of the walls of the sealing space such as are present in the standard run of pipe. To this end a thickened zone 27 is provided which projects above at least one face of the sealing member and extends circumferentially thereof. Preferably the projecting portion of the zone is of rounded cross-section and merges obtusely at its front and rear sides with the gasket body so as to provide a broad resilient face for contact with the pipe wall. The zone is located between the nose of the strip and the sealing lips so as not to interfere with their operation and projects from the adjoining surface a sufficient extent so that it will be compressed or deformed to increase friction when the pipes are coupled with the sealing member therebetween and thereby prevent retreat of the sealing member.

The radial thickness of the thickened zone is such that it is compressed or deformed by the confining pressure of the walls of the pipe members and this zone is of sufficient thickness to provide a pressure pack within the space even where the space varies in dimensions within the tolerances ordinarily permitted in pipe dimensions. At the same time it is desirable that the thickened zone be of a construction to reduce the resistance to entry of the sealing member while providing sufficient resilient pressure for resistance to retreat to prevent retractive movement of the sealing member when pressure in the line is reduced. For this purpose the sealing member is preferably formed with a hollow annular cavity between its inner and outer surfaces at the thickened zone providing an arched sealing wall 29 at the ribbed face thereof.

When pipe members are assembled in telescoping relation with the sealing member therebetween, the arched wall is depressed toward the body of the sealing member by pressure of the confining pipe walls so that a pressure sealing of the joint adequate to resist low pressures, is initially established. As fluid pressure is applied to the pipe, the sealing member is moved into a narrower space of the joint by the increased pressure. Due to such movement the deformation of the material of the arched wall is principally in a rearward direction away from the nose of the sealing member. Thereafter, under the influence of a force applied to the sealing member to force it rearwardly or due to recovery of the sealing member from deformation the material of the thickened zone pressing against the wall of the pipe can resist such movement by a rolling action which causes even greater holding resistance. Apparently there is an upsetting of the material at or adjacent to the zone possibly caused by a tendency of the arched wall to roll on its round bearing surface and pile up on the tapered nose portion. The greater the force tending to drive the sealing member back, the greater the resistance to rearward movement becomes. The fact that the sealing member is usually lubricated before insertion in the joint has a considerable part in effecting this action of resisting removal, as the lubricating material naturally dries out or is forced out from between the surfaces by the pressure. In such situations the material of the sealing member will "freeze" or adhere to the wall surface in time increasing the hold of the sealing member at the thickened zone and inducing a rolling or upsetting action upon any tendency of rearward movement of the sealing member.

The action of the thickened zone 27 in resisting rearward movement of the sealing member may be modified by the shape and arrangement of the hollowed portion thereof to provide maximum packing pressure with the desired ease of assembly. The hollowed portion may, for example, be divided by partition walls as in Fig. 2 where the wall 30 is disposed radially of the pipe axis to resist collapse of the thickened zone by compression, or in Fig. 3 where a plurality of such radially disposed walls 31, 32 are employed for the same purpose, or in Fig. 4 where a partition 33 is disposed axially of the pipe and separates the spaces 34, 35 in such a way as to resist axial stretching of the sealing member and thereby resist flattening of the arched wall.

In the form of the invention illustrated in Fig. 5 a radially disposed partition 40 is employed in combination with angularly disposed partitions 41, 42 to separate cavities 43, 44, 45, the angular partitions being employed to resist axial stretch and the partition 40 being employed to resist radial deformation of the thickened zone.

In any of the forms either side of the sealing member may face the male pipe member although the tapered side of the sealing member preferably should face the tapered pipe member. In Fig. 7 the sealing members are used to seal the joints between unthreaded metal pipes 50, 51 and a metal sleeve member 52. The sleeve member has tapered walls 53, 54 to meet the tapered face of the sealing member and an annular partition flange 55 which acts as a pipe stop to limit insertion of the pipes. The sealing members 56, 57 may be any of the types illustrated and described but are shown as of the type of Fig. 1.

In assembling either of the joints of Figs. 6 and 7, the sealing members are inserted in the sleeve member. This is readily accomplished, as the sealing member is flexible and may be distorted to reduce its circumference and then snapped in place. The pipe members are then inserted by axial movement, their ends being preferably lubricated for this purpose. As the pipe is moved into place, the thickened zone of the sealing member is deformed so as to pack the joint initially and the sealing lips are deflected so as to engage the walls of the pipe and seal the space against low pressure.

After assembly, pressure is applied to the line and the wedge portions of the sealing member are driven into the tapered space between the pipe and the sleeve, the sealing lips bearing against the pipe walls and preventing seepage of fluid so that the full pressure of the fluid is applied to drive the sealing member into place. Upon drop in line pressure the deformed thickened zone provides friction to resist retreat of the wedge portion.

Each end of the sleeve with the male pipe member adjacent thereto and the sealing member therebetween may be regarded as a joint, and the invention is equally applicable to bell and spigot pipe joints where the spigot corresponds to the pipe member 10 or 50 and the bell end of an adjacent pipe member replaces the member 12 or 52.

Variations may be made without departing from the scope of the invention as it is defined by the accompanying claims.

I claim:

1. A pressure fluid sealing gasket for an annular tapered joint space between inner and outer pipe members to seal the tapered space by a wedging of the gasket therein under the force of fluid pressure behind the gasket, said gasket being in one piece of resilient rubber-like material and having inner and outer lips at its rear end adapted to engage the inner and outer walls, respectively, of said space, the inner lip projecting rearward and radially inward and the outer lip projecting rearward and radially outward of the body of the gasket, and both lips tapering to edges adapted to remain against the walls of said space to bar the pressure fluid and utilize the same to urge the gasket forwardly to wedge in said space, a projecting portion at a peripheral face of the gasket, axially-spaced from said lips for non-interfering action, adapted to engage the adjacent wall of the space to resist rearward movement of the gasket in said space from its forward wedged position, said projecting portion providing a locally radially thickened zone of the gasket adapted to be deformed when the gasket is driven forwardly into the space and the gasket having a recess at said thickened zone to reduce its resistance to deformation.

2. A pressure sealing gasket for the annular joint space between inner and outer members, said gasket comprising a body of resilient rubber-like material adapted to be driven forwardly to wedge in the space under the force of fluid pressure from within the members to pack the space, and means for resisting rearward movement of the gasket from its packing position, said means comprising a radially thickened zone of the gasket adapted to be deformed when the gasket is driven forwardly into the space, said thickened zone being chambered to reduce its resistance to deformation, and the chambered portion having partition walls for stiffening the same.

3. A pressure sealing gasket for the annular joint space between inner and outer members, said gasket comprising an elongated body of resilient rubber-like material adapted to be driven forwardly to wedge in the space under the force of fluid pressure from within the members to pack the space, inwardly and outwardly directed sealing lips for engaging the walls of the space in sealing relation thereto, and means for resisting rearward movement of the gasket from its packing position, said means comprising a radially thickened zone shorter than the length of the gasket adapted to be deformed when the gasket is driven forwardly into the space, said thickened zone being chambered to reduce its resistance to deformation, and the chambered portion having partition walls for stiffening the same.

TRACY D. NATHAN.